US006781048B1

(12) United States Patent
Royce

(10) Patent No.: US 6,781,048 B1
(45) Date of Patent: Aug. 24, 2004

(54) TUNING TOOL FOR A STRINGED INSTRUMENT AND METHOD OF TUNING A STRINGED INSTRUMENT

(76) Inventor: Robert F. Royce, 30 Holly Mar Hill Rd., Northford, CT (US) 06472

( * ) Notice: Subject to any disclaimer, the term of this patent is extended or adjusted under 35 U.S.C. 154(b) by 0 days.

(21) Appl. No.: 10/414,646

(22) Filed: Apr. 16, 2003

(51) Int. Cl.[7] .................................................. G01G 7/02
(52) U.S. Cl. ............................................ 84/454; 84/453
(58) Field of Search .......................... 84/454, 453, 455, 84/458, 459

(56) References Cited

U.S. PATENT DOCUMENTS

| | | | | |
|---|---|---|---|---|
| 1,561,566 A | | 11/1925 | Purdy | |
| 1,579,987 A | | 4/1926 | Wickes | |
| 4,005,628 A | | 2/1977 | Darling | |
| 4,077,295 A | | 3/1978 | Zapp | |
| 4,625,614 A | | 12/1986 | Spercel | |
| 5,018,424 A | | 5/1991 | Steinberger | |
| 5,097,736 A | | 3/1992 | Turner | |
| 5,696,341 A | * | 12/1997 | McCane | 84/453 |
| 6,294,719 B1 | * | 9/2001 | Palecki et al. | 84/458 |

* cited by examiner

*Primary Examiner*—Kimberly Lockett
(74) *Attorney, Agent, or Firm*—Barry R. Lipsitz; Douglas M. McAllister

(57) ABSTRACT

The present invention provides a tuning tool for a stringed instrument and methods for tuning a stringed instrument. The tuning tool comprises a knob and a recess in the knob adapted to accept a tuning peg of the stringed instrument. The knob provides increased leverage for tuning the stringed instrument. The recess enables the tuning tool to be temporarily fitted over the tuning peg.

29 Claims, 2 Drawing Sheets

TUNING TOOL FOR A STRINGED INSTRUMENT AND METHOD OF TUNING A STRINGED INSTRUMENT

BACKGROUND OF THE INVENTION

The present invention relates to tuning of musical instruments. More specifically, the present invention relates to a tuning tool for a stringed instrument and methods for tuning a stringed instrument.

Stringed instruments are traditionally provided with tapered tuning pegs for adjusting the tension of the strings of the instrument. Such tapered pegs are difficult to turn due to their small size and the limited leverage provided thereby. It is also difficult to obtain precise tuning of the stringed instrument with such tuning pegs. Repeated and constant tuning of stringed instruments, such as violins, violas, cellos, and guitars, which have traditional tapered tuning pegs, can lead to physical injury to the user, such as tendon or muscle injuries.

It would be advantageous to provide a tuning tool adapted to fit over a traditional tuning peg of a musical instrument which provides increased leverage and greater tuning accuracy, while also reducing the risk of physical injury to the user. It would be advantageous if such a device comprised a removable tuning tool which easily fit over a variety of peg sizes and designs, without the need to modify the original tuning peg.

The methods and apparatus of the present invention provide the foregoing and other advantages.

SUMMARY OF THE INVENTION

The present invention relates to a tuning tool for a stringed instrument and methods of tuning a stringed instrument.

In an example embodiment of the invention, a tuning tool for a stringed instrument is provided. The tuning tool comprises a knob and a recess in the knob adapted to accept a tuning peg of the stringed instrument. The knob provides increased leverage for tuning the stringed instrument. The recess enables the tuning tool to be temporarily fitted over the tuning peg.

In a further example embodiment, the knob may comprise a grip and a base. The recess may be located in the base. The base may be elongated and extend from the grip in order to prevent interference from adjacent tuning pegs. The base should extend from the grip at least enough such that the grip is not in contact with adjacent tuning pegs when the tuning tool is fitted over one of the tuning pegs. In such an embodiment, the base should be dimensioned so as to fit over a tuning peg without contacting an adjacent tuning peg.

The recess may comprise a slot. Those skilled in the art will appreciate that the recess may take a variety of forms, depending on the style, shape and contour of the tuning peg that the tuning tool is intended to be used with.

A gripping portion of the knob may be rounded. Alternatively, the gripping portion of the knob may be elliptically shaped or substantially square in shape with rounded edges. A gripping portion of the knob may be knurled to provide an improved grip. Those skilled in the art will appreciate that the gripping portion of the knob may take a variety of shapes.

The stringed instrument may comprise a violin, a cello, a viola, a guitar, a harp, a sitar, a bandura, a banjo, a fiddle, a hurdy-gurdy, a lute, a mandolin, a ukulele, or other stringed instrument.

A method for tuning a stringed instrument using a separate tuning tool is also provided in accordance with the invention. A recess of a tuning tool of the type described above is placed over a tuning peg of the stringed instrument. Once in place, a knob of the tuning tool may be turned to tune the stringed instrument.

BRIEF DESCRIPTION OF THE DRAWINGS

The present invention will hereinafter be described in conjunction with the appended drawing figures, wherein like numerals denote like elements, and.

DETAILED DESCRIPTION OF THE INVENTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 3:
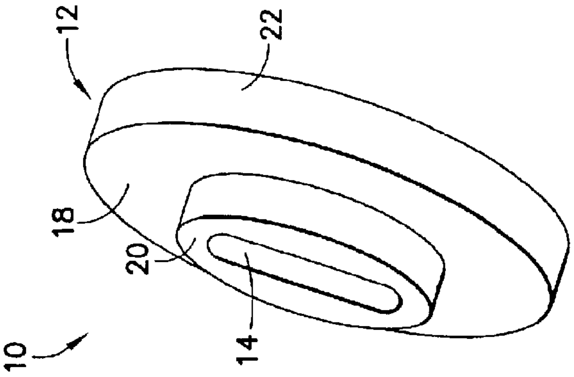
FIG. 3 shows a perspective view of an example embodiment of the invention.
Figure 1:
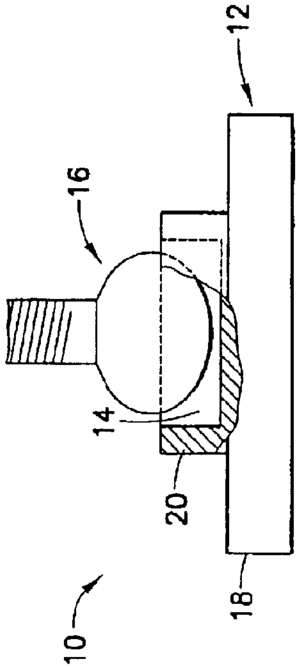
FIG. 1 shows a side view of an example embodiment of the invention.
Figure 2:
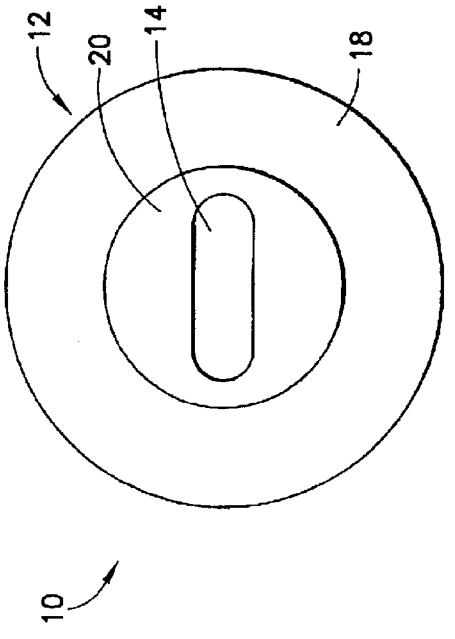
FIG. 2 shows a bottom view of an example embodiment of the invention.

In an example embodiment of the invention as shown in FIGS. 1–3, a tuning tool 10 for a stringed instrument is provided. The tuning tool comprises a knob 12 and a recess 14 in the knob 12 adapted to accept a tuning peg 16 of the stringed instrument. The knob 12 provides increased leverage for tuning the stringed instrument. The recess 14 enables the tuning tool 10 to be temporarily fitted over the tuning peg 16.

In a further example embodiment, the knob 12 may comprise a grip 18 and a base 20. The recess 14 may be located in the base 20.

Figure 5:
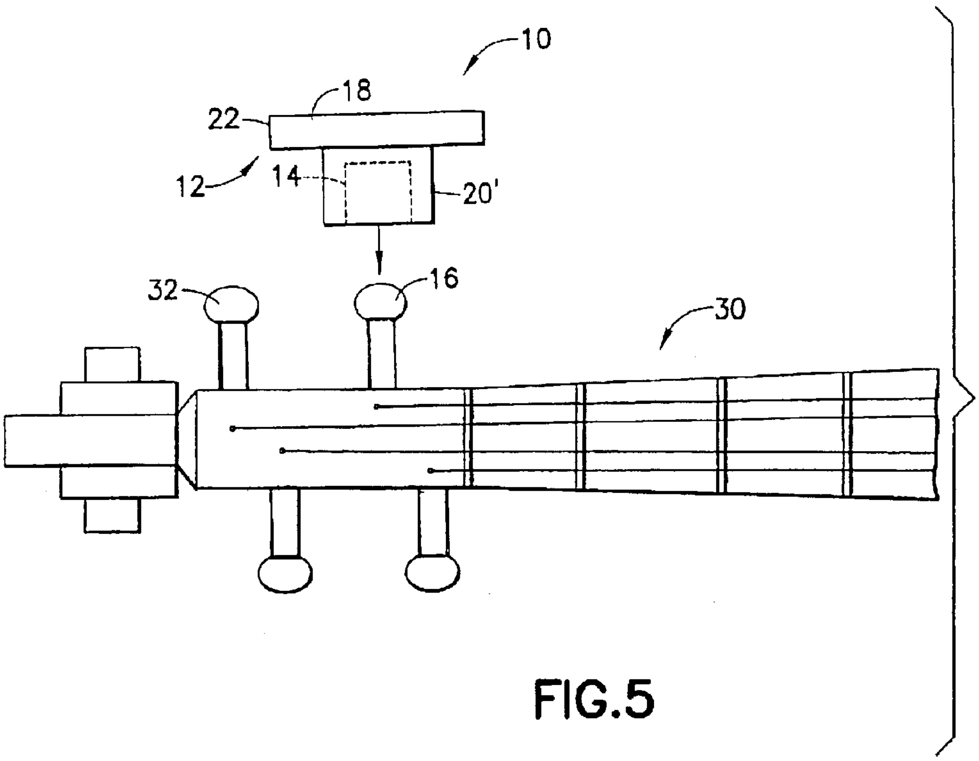
FIG. 5 shows how a tuning knob in accordance with the invention can be fitted over the tuning peg of a stringed instrument.
Figure 4:
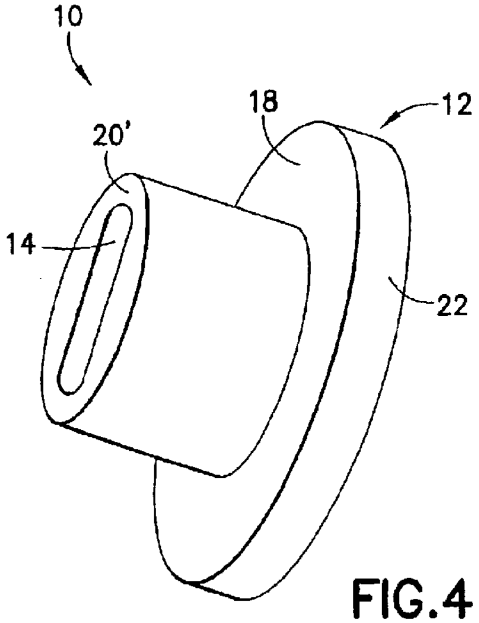
FIG. 4 shows a perspective view of a further example embodiment of the invention.

In an alternate example embodiment as shown in FIG. 4, the base 20' may be elongated and extend from the grip 18 in order to prevent interference with adjacent tuning pegs. As shown in FIG. 5, the base 20' should extend from the grip 18 at least enough such that the grip 18 is not in contact with adjacent tuning pegs 32 when the tuning tool 10 is fitted over one of the tuning pegs 16. In such an embodiment, the base 20' should be dimensioned so as to fit over a tuning peg 16 without contacting an adjacent tuning peg 32.

The recess 14 may comprise a slot. Those skilled in the art will appreciate that the recess 14 may take a variety of forms, depending on the style, shape and contour of the tuning peg 16 that the tuning tool 10 is intended to be used with.

A gripping portion 22 (e.g., the outer face of the grip 18) of the knob 12 may be rounded. Alternatively, the gripping portion 22 of the knob 12 may be elliptically shaped or substantially square in shape with rounded edges. A gripping portion 22 of the knob may be knurled to provide an improved grip. Those skilled in the art will appreciate that the gripping portion 22 of the knob 12 may take a variety of shapes and have one or more different surface treatments to facilitate the use of the device. For example, instead of (or in addition to) knurling the surface of the gripping portion, a resilient grip (e.g., a rubber or soft plastic coating) may be applied thereto. Alternatively, projections to facilitate a good grip can be provided on or adjacent to the gripping portion.

The stringed instrument 30 may comprise a violin, a cello, a viola, a guitar, a harp, a sitar, a bandura, a banjo, a fiddle, a hurdy-gurdy, a lute, a mandolin, a ukulele, or other stringed instrument that employ traditional tapered friction fit pegs.

A method for tuning a stringed instrument 30 using a separate tuning tool is also provided in accordance with the invention. As shown in FIG. 5, a recess 14 of a tuning tool 10 (of the type described above in connection with FIGS. 1–4) is placed over a tuning peg 16 of the stringed instrument 30. Once in place, a knob portion 18 of the tuning tool 10 may be turned to tune the stringed instrument 30. The recess 14 may be located in the base 20 and the base may be coaxial with the knob 18.

It should now be appreciated that the present invention provides advantageous methods and apparatus for tuning a stringed instrument, which provide increased leverage and increased tuning precision.

Although the invention has been described in connection with various illustrated embodiments, numerous modifications and adaptations may be made thereto without departing from the spirit and scope of the invention as set forth in the claims.

What is claimed is:

1. A tuning tool for a stringed instrument, comprising:

a knob having a grip and a base coaxial with said grip; and a recess in said base adapted to accept a tuning peg of said stringed instrument;

wherein:

a diameter of said grip is larger than a diameter of said base in order to provide increased leverage for tuning said stringed instrument.

2. A tuning tool in accordance with claim 1, wherein said recess enables said tuning tool to be temporarily fitted over said tuning peg.

3. A tuning tool in accordance with claim 1, wherein said diameter of said grip is approximately twice as large as said diameter of said base.

4. A tuning tool in accordance with claim 3, wherein:

said base is elongated and extends from said grip in order to prevent interference from adjacent tuning pegs; and said base is dimensioned so as to fit over said tuning peg without contacting an adjacent tuning peg.

5. A tuning tool in accordance with claim 1, wherein said recess comprises a slot.

6. A tuning tool in accordance with claim 1, wherein said grip is rounded.

7. A tuning tool in accordance with claim 1, wherein said grip is elliptically shaped.

8. A tuning tool in accordance with claim 1, wherein said grip is substantially square in shape with rounded edges.

9. A tuning tool in accordance with claim 1, wherein said grip is knurled.

10. A tuning tool in accordance with claim 1, wherein said grip comprises a resilient coating to improve grip.

11. A tuning tool in accordance with claim 10, wherein said resilient coating comprises one of a rubber or soft plastic coating.

12. A tuning tool in accordance with claim 1, further comprising one or more projections extending from said knob.

13. A tuning tool in accordance with claim 1, wherein said stringed instrument comprises one of a violin, a cello, a viola, a guitar, a harp, a sitar, a bandura, a banjo, a fiddle, a hurdy-gurdy, a lute, a mandolin, or a ukulele.

14. A method of tuning a stringed instrument using a separate tuning tool, comprising:

placing a recess of a tuning tool over a tuning peg of said stringed instrument;

turning a grip of said tuning tool to tune said stringed instrument;

wherein:

said recess is located in a base of said tuning tool, which base is coaxial with said grip;

a diameter of said grip is larger than a diameter of said base in order to provide increased leverage for tuning said stringed instrument.

15. A method in accordance with claim 14, wherein said recess enables said tuning tool to be temporarily fitted over said tuning peg.

16. A method in accordance with claim 14, wherein said diameter of said grip is approximately twice as large as said diameter of said base.

17. A method in accordance with claim 16, wherein:

said base is elongated and extends from said grip in order to prevent interference from adjacent tuning pegs; and said base is dimensioned so as to fit over said tuning peg without contacting an adjacent tuning peg.

18. A method in accordance with claim 14, wherein said recess comprises a slot.

19. A method in accordance with claim 14, wherein said grip is rounded.

20. A method in accordance with claim 14, wherein said grip is elliptically shaped.

21. A method in accordance with claim 14, wherein said grip is substantially square in shape with rounded edges.

22. A method in accordance with claim 14, wherein said grip is knurled.

23. A method in accordance with claim 14, wherein said grip comprises a resilient coating to improve grip.

24. A method in accordance with claim 23, wherein said resilient coating comprises one of a rubber or soft plastic coating.

25. A method in accordance with claim 14, wherein one or more projections extend from said knob.

26. A method in accordance with claim 14, wherein said stringed instrument comprises one of a violin, a cello, a viola, a guitar, a harp, a sitar, a bandura, a banjo, a fiddle, a hurdy-gurdy, a lute, a mandolin, or a ukulele.

27. A tuning tool in accordance with claim 1, wherein said grip is adapted to fit within and substantially fill the palm of a user's hand.

28. A tuning tool in accordance with claim 1, wherein said grip and said base are fabricated as a single piece.

29. A tuning tool in accordance with claim 1, wherein said grip and said base comprise concentric substantially disk-shaped elements.

* * * * *